US009201270B2

(12) United States Patent
Fattal et al.

(10) Patent No.: US 9,201,270 B2
(45) Date of Patent: Dec. 1, 2015

(54) DIRECTIONAL BACKLIGHT WITH A MODULATION LAYER

(71) Applicant: LEIA INC., Menlo Park, CA (US)

(72) Inventors: David A. Fattal, Mountain View, CA (US); James A. Brug, Menlo Park, CA (US); Charles M. Santori, Palo Alto, CA (US); Marco Fiorentino, Mountain View, CA (US); Zhen Peng, Foster City, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 14/309,005

(22) Filed: Jun. 19, 2014

(65) Prior Publication Data
US 2014/0300840 A1 Oct. 9, 2014

Related U.S. Application Data

(63) Continuation of application No. PCT/US2012/040607, filed on Jun. 1, 2012.

(51) Int. Cl.
 *G02F 1/1335* (2006.01)
 *G02B 27/22* (2006.01)
(52) U.S. Cl.
 CPC ...... *G02F 1/133615* (2013.01); *G02B 27/2214* (2013.01); *G02F 1/133504* (2013.01)
(58) Field of Classification Search
 CPC ................. G02F 1/133615; G02F 1/133504; G02B 27/2214
 USPC .......................... 349/15, 61, 64; 362/617, 619
 See application file for complete search history.

(56) References Cited

U.S. PATENT DOCUMENTS

| 5,184,848 A | 2/1993 | Itoh et al. |
| 5,301,062 A | 4/1994 | Takahashi et al. |
| 5,615,024 A | 3/1997 | May et al. |
| 5,617,248 A | 4/1997 | Takahashi et al. |

(Continued)

FOREIGN PATENT DOCUMENTS

| CN | 1213097 A | 4/1999 |
| CN | 1479878 A | 3/2004 |

(Continued)

OTHER PUBLICATIONS

International Search Report and Written Opinion (ISR/WO) of the International Searching Authority (ISA/KR) mail date Mar. 11, 2013 (8 pages) for counterpart PCT patent application No. PCT/US2012/040607.

(Continued)

*Primary Examiner* — Nathanael R Briggs
(74) *Attorney, Agent, or Firm* — North Shore Associates; J. Michael Johnson (57) ABSTRACT

A directional backlight is disclosed. The directional backlight has a directional backplane that has a plurality of directional pixels to scatter a plurality of input planar lightbeams into a plurality of directional lightbeams. Each directional lightbeam has a direction and angular spread controlled by characteristics of a directional pixel in the plurality of directional pixels. A modulation layer having a plurality of modulators modulates the plurality of directional lightbeams. The directional backlight can be used to generate a 3D image with multiple views by specifying the characteristics of the directional pixels in the directional backplane.

24 Claims, 9 Drawing Sheets

(56) References Cited

U.S. PATENT DOCUMENTS

| | | | |
|---|---|---|---|
| 5,721,598 A | 2/1998 | Smith | |
| 5,729,311 A | 3/1998 | Broer et al. | |
| 5,926,294 A * | 7/1999 | Sato et al. | 359/22 |
| 6,158,884 A | 12/2000 | Lebby et al. | |
| 6,437,920 B1 | 8/2002 | Wohlstadter | |
| 6,490,393 B1 | 12/2002 | Zhou | |
| 6,667,819 B2 | 12/2003 | Nishikawa et al. | |
| 6,718,093 B2 | 4/2004 | Zhou | |
| 6,980,271 B2 | 12/2005 | Fujishiro | |
| 7,044,628 B2 | 5/2006 | Choi et al. | |
| 7,742,120 B2 | 6/2010 | Bayley et al. | |
| 7,773,849 B2 | 8/2010 | Shani | |
| 7,859,947 B2 | 12/2010 | Kawai | |
| 7,903,332 B2 | 3/2011 | De Zwart et al. | |
| 8,026,997 B2 | 9/2011 | Feng | |
| 8,681,423 B1 | 3/2014 | Gibson et al. | |
| 8,915,635 B2 | 12/2014 | Fiorentino et al. | |
| 2002/0008834 A1 | 1/2002 | Suzuki | |
| 2002/0075445 A1 | 6/2002 | Dabrowski et al. | |
| 2003/0086649 A1 | 5/2003 | Zhou | |
| 2004/0130879 A1 | 7/2004 | Choi et al. | |
| 2004/0156182 A1 | 8/2004 | Hatjasalo et al. | |
| 2004/0156589 A1 | 8/2004 | Gunn et al. | |
| 2005/0041174 A1 | 2/2005 | Numata et al. | |
| 2005/0073627 A1 | 4/2005 | Akiyama | |
| 2005/0123229 A1 | 6/2005 | Huck et al. | |
| 2005/0140832 A1 | 6/2005 | Goldman et al. | |
| 2006/0104570 A1 | 5/2006 | Rausch | |
| 2007/0129864 A1 | 6/2007 | Tanaka et al. | |
| 2007/0213955 A1 | 9/2007 | Ishida et al. | |
| 2007/0236801 A1 | 10/2007 | Cha et al. | |
| 2007/0279367 A1 | 12/2007 | Kitai | |
| 2007/0298533 A1 * | 12/2007 | Yang et al. | 438/57 |
| 2008/0204663 A1 | 8/2008 | Balogh | |
| 2008/0204873 A1 | 8/2008 | Daniell | |
| 2008/0285307 A1 | 11/2008 | Aylward et al. | |
| 2009/0016168 A1 | 1/2009 | Smith | |
| 2009/0207342 A1 | 8/2009 | Yamaguchi et al. | |
| 2009/0213300 A1 | 8/2009 | Daiku | |
| 2009/0290837 A1 | 11/2009 | Chen et al. | |
| 2009/0322986 A1 * | 12/2009 | Wei et al. | 349/64 |
| 2010/0103485 A1 | 4/2010 | Haussler | |
| 2010/0118117 A1 | 5/2010 | Kroll et al. | |
| 2010/0123952 A1 * | 5/2010 | Chen et al. | 359/464 |
| 2010/0207964 A1 | 8/2010 | Kimmel et al. | |
| 2010/0284085 A1 | 11/2010 | Laakkonen | |
| 2010/0289870 A1 | 11/2010 | Leister | |
| 2010/0302803 A1 | 12/2010 | Bita et al. | |
| 2011/0002143 A1 | 1/2011 | Saarikko et al. | |
| 2011/0141395 A1 | 6/2011 | Yashiro | |
| 2011/0149596 A1 | 6/2011 | Lv et al. | |
| 2011/0157667 A1 | 6/2011 | Lacoste et al. | |
| 2011/0182570 A1 | 7/2011 | Yeh | |
| 2011/0254916 A1 | 10/2011 | Fan et al. | |
| 2011/0304784 A1 | 12/2011 | Hirota et al. | |
| 2011/0308445 A1 | 12/2011 | Avda | |
| 2012/0013962 A1 | 1/2012 | Subbaraman et al. | |
| 2012/0075698 A1 | 3/2012 | Minami | |
| 2012/0113678 A1 | 5/2012 | Cornelissen et al. | |
| 2012/0120213 A1 | 5/2012 | Ohyama et al. | |
| 2012/0127573 A1 | 5/2012 | Robinson et al. | |
| 2012/0127751 A1 | 5/2012 | Kimmel et al. | |
| 2012/0176665 A1 | 7/2012 | Song et al. | |
| 2012/0249934 A1 | 10/2012 | Li et al. | |
| 2012/0250141 A1 | 10/2012 | Chen | |
| 2012/0281950 A1 | 11/2012 | Fattal et al. | |
| 2013/0057539 A1 | 3/2013 | Kim | |
| 2013/0082980 A1 * | 4/2013 | Gruhlke et al. | 345/175 |
| 2013/0201723 A1 | 8/2013 | Gourlay | |
| 2014/0111856 A1 | 4/2014 | Brug et al. | |
| 2014/0293759 A1 | 10/2014 | Taff et al. | |
| 2014/0300947 A1 | 10/2014 | Fattal et al. | |
| 2014/0300960 A1 | 10/2014 | Santori et al. | |
| 2015/0016777 A1 | 1/2015 | Abovitz et al. | |
| 2015/0036068 A1 | 2/2015 | Fattal et al. | |

FOREIGN PATENT DOCUMENTS

| | | |
|---|---|---|
| CN | 1517760 A | 8/2004 |
| CN | 202126538 | 1/2012 |
| JP | 11-326545 A | 11/1999 |
| JP | 2007033200 A | 2/2007 |
| JP | 2009053499 A | 3/2009 |
| JP | 2009288718 A | 12/2009 |
| JP | 2011029161 A | 2/2011 |
| WO | 9908257 A1 | 2/1999 |
| WO | 0242821 A1 | 5/2002 |
| WO | 2012069071 A1 | 5/2012 |
| WO | 2013162609 A1 | 10/2013 |
| WO | 2013180725 A1 | 12/2013 |
| WO | 2014120194 A1 | 8/2014 |
| WO | 2015016844 A1 | 2/2015 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Son et al., "Three-Dimensional Imaging Methods Based on Multiview Images," IEEE/OSA Journal of Display Technology, Sep. 2005, pp. 125-140, vol. 1, No. 1.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Fattal et al., "A multi-directional backlight for a wide-angle, glasses-free three-dimensional display," Nature, Mar. 21, 2013, pp. 348-351, vol. 495, Macmillan Publishers Limited, 2013.

International Search Report and Written Opinion (ISR/WO) of the International Searching Authority (ISA/KR) mail date Dec. 26, 2012 (6 pages) for counterpart PCT patent application No. PCT/US2012/035573 (WO2013162609A1).

International Search Report and Written Opinion (ISR/WO) of the International Searching Authority (ISA/KR) mail date Mar. 13, 2013 (8 pages) for counterpart PCT patent application No. PCT/US2012/040305 (WO2013180725A1).

International Search Report and Written Opinion (ISR/WO) of the International Searching Authority (ISA/KR) mail date Oct. 25, 2013 (9 pages) for counterpart PCT patent application No. PCT/US2013/024093 (WO2014120194A1).

International Search Report and Written Opinion (ISR/WO) of the International Searching Authority (ISA/KR) dated Apr. 29, 2014 (15 pages) for counterpart PCT patent application No. PCT/US2013/052774 (WO2015016844A1).

USPTO Non-final Office Action with mail date Jan. 5, 2015 for U.S. Appl. No. 14/309,601 (15 pages).

Response/Amendment filed Mar. 16, 2015 (13 pages) for U.S. Appl. No. 14/309,601 in response to non-final Office Action with mail date Jan. 5, 2015.

USPTO Final Office Action with mail date Apr. 9, 2015 for U.S. Appl. No. 14/309,601 (15 pages).

USPTO Non-final Office Action with mail date Jan. 30, 2015 for U.S. Appl. No. 14/309,532 (15 pages).

Response/Amendment filed Apr. 28, 2015 (19 pages) for U.S. Appl. No. 14/309,532 in response to non-final Office Action with mail date Jan. 30, 2015.

USPTO Non-final Office Action with mail date Sep. 23, 2014 for U.S. Appl. No. 14/308,961 (12 pages).

(56) References Cited

OTHER PUBLICATIONS

Response/Amendment filed Dec. 22, 2014 (25 pages) for U.S. Appl. No. 14/308,961 in response to non-final Office Action with mail date Sep. 23, 2014.
USPTO Non-final Office Action with mail date Oct. 16, 2014 for U.S. Appl. No. 14/308,689 (9 pages).
Response/Amendment filed Dec. 22, 2014 (18 pages) for U.S. Appl. No. 14/308,689 in response to non-final Office Action with mail date Oct. 16, 2014.
USPTO Notice of Allowance and Fee(s) Due& Notice of Allowability with mail date Apr. 17, 2015 for U.S. Appl. No. 14/308,689 (7 pages).
USPTO Non-final Office Action with mail date Apr. 24, 2015 for U.S. Appl. No. 14/308,961 (21 pages).

* cited by examiner

DIRECTIONAL BACKLIGHT WITH A MODULATION LAYER

CROSS-REFERENCE TO RELATED APPLICATIONS

This application is a continuation application of and claims the benefit of priority to prior International Application No. PCT/US2012/040607, filed Jun. 1, 2012, the entire contents of which is incorporated herein by reference.

STATEMENT REGARDING FEDERALLY SPONSORED RESEARCH OR DEVELOPMENT

N/A

BACKGROUND

The ability to reproduce a light field in a display screen has been a key quest in imaging and display technology. A light field is the set of all light rays traveling in every direction through every point in space. Any natural, real-world scene can be fully characterized by its light field, providing information on the intensity, color, and direction of all light rays passing through the scene. The goal is to enable viewers of a display screen to experience a scene as one would experience it in person.

Currently available display screens in televisions, personal computers, laptops, and mobile devices remain largely two-dimensional and are thus not capable of accurately reproducing a light field. Three-dimensional ("3D") displays have recently emerged but suffer from inefficiencies in angular and spatial resolution in addition to providing a limited number of views. Examples include 3D displays based on holograms, parallax barriers, or lenticular lenses.

A common theme among these displays is their difficulty to generate light fields that are controlled with precision at the pixel level to achieve good image quality for a wide range of viewing angles and spatial resolutions.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A directional backlight with a modulation layer is disclosed. As generally used herein, a directional backlight is a layer in a display screen (e.g., an LCD display screen) that is used to provide a light field in the form of directional lightbeams. The directional lightbeams are scattered by a plurality of directional pixels in the directional backlight. Each directional lightbeam originates from a different directional pixel and has a given direction and angular spread based on characteristics of the directional pixel. This pointed directionality enables directional beams to be modulated (i.e., turned on, off or changed in brightness) using a plurality of modulators. The modulators may be, for example, Liquid Crystal Display ("LCD") cells (with or without polarizers). Other types of modulators may be used, such as those based on a different mechanism including micro-electrical-mechanical ("MEMS"), fluidic, magnetic, electrophoretic, or other mechanism that modulates the intensity of light upon application of an electrical signal.

In various examples, the directional pixels are arranged in a directional backplane that is illuminated by a plurality of input planar lightbeams. The directional pixels receive the input planar lightbeams and scatter a fraction of them into directional lightbeams. A modulation layer is placed above the directional pixels to modulate the directional lightbeams as desired. The modulation layer includes a plurality of modulators (e.g., LCD cells), with each modulator modulating a single directional lightbeam from a single directional pixel or a set of directional lightbeams from a set of directional pixels. The modulation layer enables 3D images to be generated with many different views, with each view provided by a set of directional lightbeams.

In various examples, the directional pixels in the directional backplane have patterned gratings of substantially parallel grooves arranged in or on top of the directional backplane. The directional backplane may be, for example, a slab of transparent material that guides the input planar lightbeams into the directional pixels, such as, for example, Silicon Nitride ("SiN"), glass or quartz, plastic, Indium Tin Oxide ("ITO"), among others. The patterned gratings can consist of grooves etched directly in or made of material deposited on top of the directional backplane or the waveguides (e.g., any material that can be deposited and etched or lift-off, including any dielectrics or metal). The grooves may also be slanted.

As described in more detail herein below, each directional pixel may be specified by a grating length (i.e., dimension along the propagation axis of the input planar lightbeams), a grating width (i.e., dimension across the propagation axis of the input planar lightbeams), a groove orientation, a pitch, and a duty cycle. Each directional pixel may emit a directional lightbeam with a direction that is determined by the groove orientation and the grating pitch and with an angular spread that is determined by the grating length and width. By using a duty cycle of or around 50%, the second Fourier coefficient of the patterned gratings vanishes thereby preventing the scattering of light in additional unwanted directions. This insures that only one directional lightbeam emerges from each directional pixel regardless of its output angle.

As further described in more detail herein below, a directional backlight can be designed with directional pixels that have a certain grating length, a grating width, a groove orientation, a pitch and a duty cycle that are selected to produce a given 3D image. The 3D image is generated from the directional lightbeams emitted by the directional pixels and modulated by the modulation layer, with modulated directional lightbeams from a set of directional pixels generating a given image view.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Figure 1:
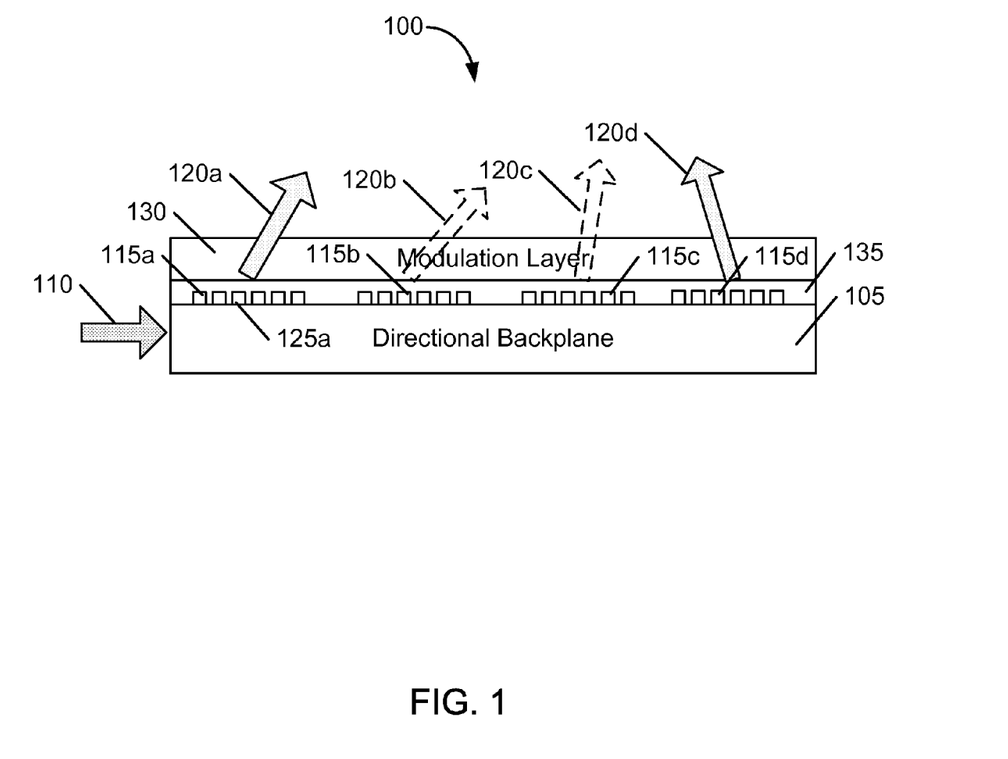
FIG. 1 illustrates a schematic diagram of a directional backlight in accordance with various examples.

Referring now to FIG. 1, a schematic diagram of a directional backlight in accordance with various examples is described. Directional backlight 100 includes a directional backplane 105 that receives a set of input planar lightbeams 110 from a plurality of light sources. The plurality of light sources may include, for example, one or more narrow-bandwidth light sources with a spectral bandwidth of approximately 30 nm or less, such as Light Emitting Diodes ("LEDs"), lasers, and so on. The input planar lightbeams 110 propagate in substantially the same plane as the directional backplane 105, which is designed to be substantially planar.

The directional backplane 105 may consist of a slab of a transparent material (e.g., SiN, glass or quartz, plastic, ITO, etc.) having a plurality of directional pixels 115a-d arranged in or on top of the directional backplane 105. The directional pixels 115a-d scatter a fraction of the input planar lightbeams 110 into directional lightbeams 120a-d. In various examples, each directional pixel 115a-d has patterned gratings of substantially parallel grooves, e.g., grooves 125a for directional pixel 115a. The thickness of the grating grooves can be substantially the same for all grooves resulting in a substantially planar design. The grooves can be etched in the directional backplane or be made of material deposited on top of the directional backplane 105 (e.g., any material that can be deposited and etched or lift-off, including any dielectrics or metal).

Each directional lightbeam 120a-d has a given direction and an angular spread that is determined by the patterned grating forming the corresponding directional pixel 115a-d. In particular, the direction of each directional lightbeam 120a-d is determined by the orientation and the grating pitch of the patterned gratings. The angular spread of each directional lightbeam is in turn determined by the grating length and width of the patterned gratings. For example, the direction of directional lightbeam 115a is determined by the orientation and the grating pitch of patterned gratings 125a.

It is appreciated that this substantially planar design and the formation of directional lightbeams 120a-d from input planar lightbeams 110 requires gratings having a substantially smaller pitch than traditional diffraction gratings. For example, traditional diffraction gratings scatter light upon illumination with lightbeams that are propagating substantially across the plane of the grating. Here, the gratings in each directional pixel 115a-d are substantially on the same plane as the input planar lightbeams 110 when generating the directional lightbeams 120a-d.

The directional lightbeams 120a-d are precisely controlled by characteristics of the gratings in directional pixels 115a-d including a grating length L, a grating width W, a groove orientation angle θ, and a grating pitch L. In particular, the grating length L of grating 125a controls the angular spread ΔΘ of the directional lightbeam 120a along the input light propagation axis and the grating width W controls the angular spread ΔΘ of the directional lightbeam 120a across the input light propagation axis, as follows:

$$\Delta\Theta \approx \frac{4\lambda}{\pi L}\left(\frac{4\lambda}{\pi W}\right) \quad \text{(Eq. 1)}$$

where λ is the wavelength of the directional lightbeam 120a. The groove orientation, specified by the grating orientation angle θ, and the grating pitch or period, specified by Λ, control the direction of the directional lightbeam 120a.

The grating length L and the grating width W can vary in size in the range of 0.1 to 200 μm. The groove orientation angle θ and the grating pitch Λ may be set to satisfy a desired direction of the directional lightbeam 120a, with, for example, the groove orientation angle θ on the order of −40 to +40 degrees and the grating pitch Λ on the order of 200-700 nm.

In various examples, a modulation layer 130 having a plurality of modulators (e.g., LCD cells) is positioned above the directional pixels 115a-d to modulate the directional lightbeams 120a-d scattered by the directional pixels 115a-d. Modulation of directional lightbeams 120a-d involves controlling their brightness with the modulators (e.g., turning them on, off, or changing their brightness). For example, the modulators in the modulation layer 130 may be used to turn on directional lightbeams 120a and 120d and turn off directional lightbeams 120b and 120c. The ability to provide modulation for the directional lightbeams 120a-d enables many different image views to be generated.

The modulation layer 130 may be placed on top of a spacer layer 135, which may be made of a material or simply consist of a spacing (i.e., air) between the directional pixels 115a-d and the modulators the modulation layer 130. The spacer layer 135 may have a width, for example, on the order of 0-100 μm.

It is appreciated that directional backplane 105 is shown with four directional pixels 115a-d for illustration purposes only. A directional backplane in accordance with various examples can be designed with many directional pixels (e.g., higher than 100), depending on how the directional backplane is used (e.g., in a 3D display screen, in a 3D watch, in a mobile device, etc.). It is also appreciated that the directional pixels may have any shape, including for example, a circle, an ellipse, a polygon, or other geometrical shape.

Figure 2A:
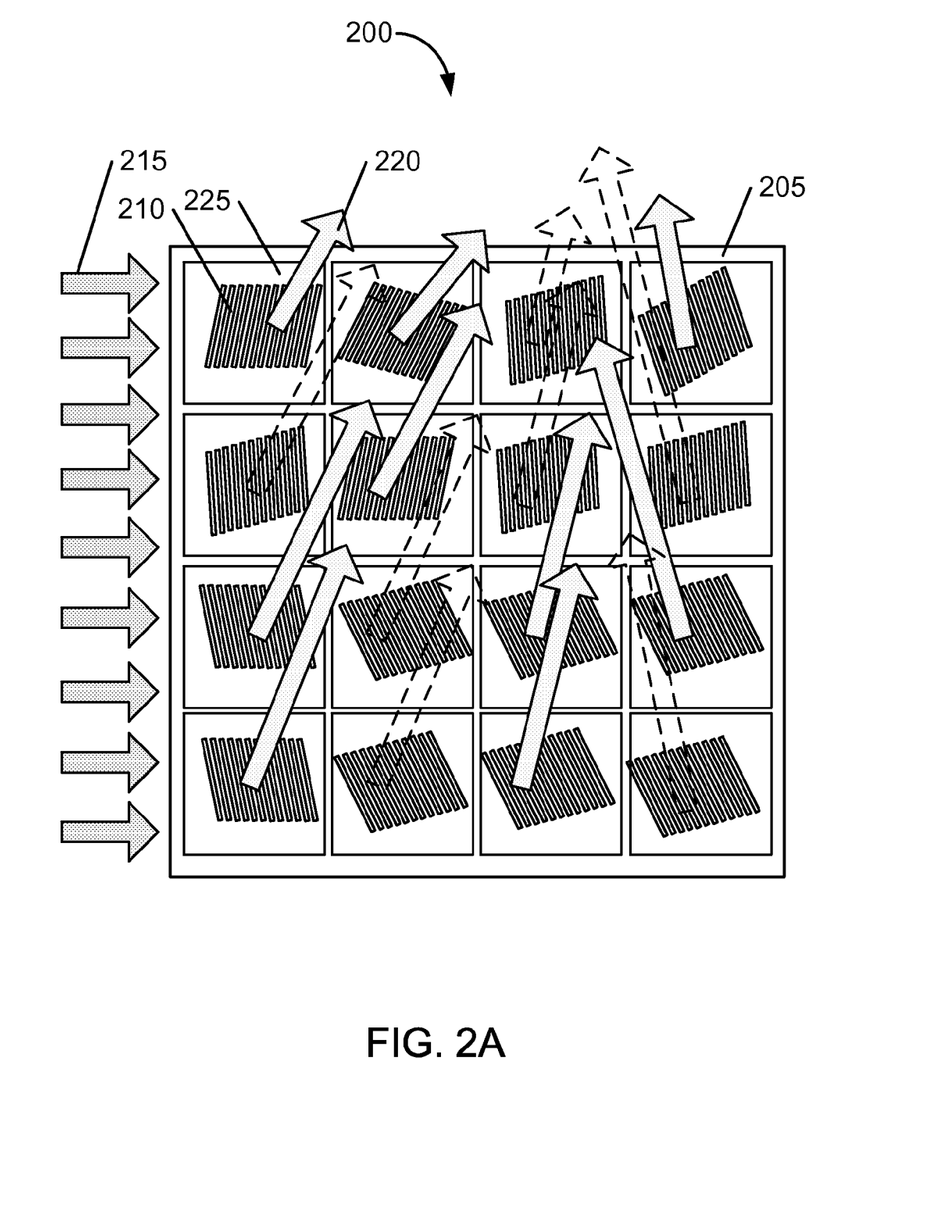
FIGS. 2A-B illustrate example top views of a directional backlight according to FIG. 1.

Attention is now directed to FIGS. 2A-B, which illustrate top views of a directional backlight according to FIG. 1. In FIG. 2A, directional backlight 200 is show with a directional backplane 205 consisting of a plurality of polygonal directional pixels (e.g., directional pixel 210) arranged in a transparent slab. Each directional pixel is able to scatter a portion of the input planar lightbeams 215 into an output directional lightbeam (e.g., directional lightbeam 220). Each directional lightbeam is modulated by a modulator, e.g., LCD cell 225 for directional lightbeam 220. The directional lightbeams scattered by all the directional pixels in the directional backplane 205 and modulated by the modulators (e.g., LCD cell 225) can represent multiple image views that when combined form a 3D image.

Figure 2B:
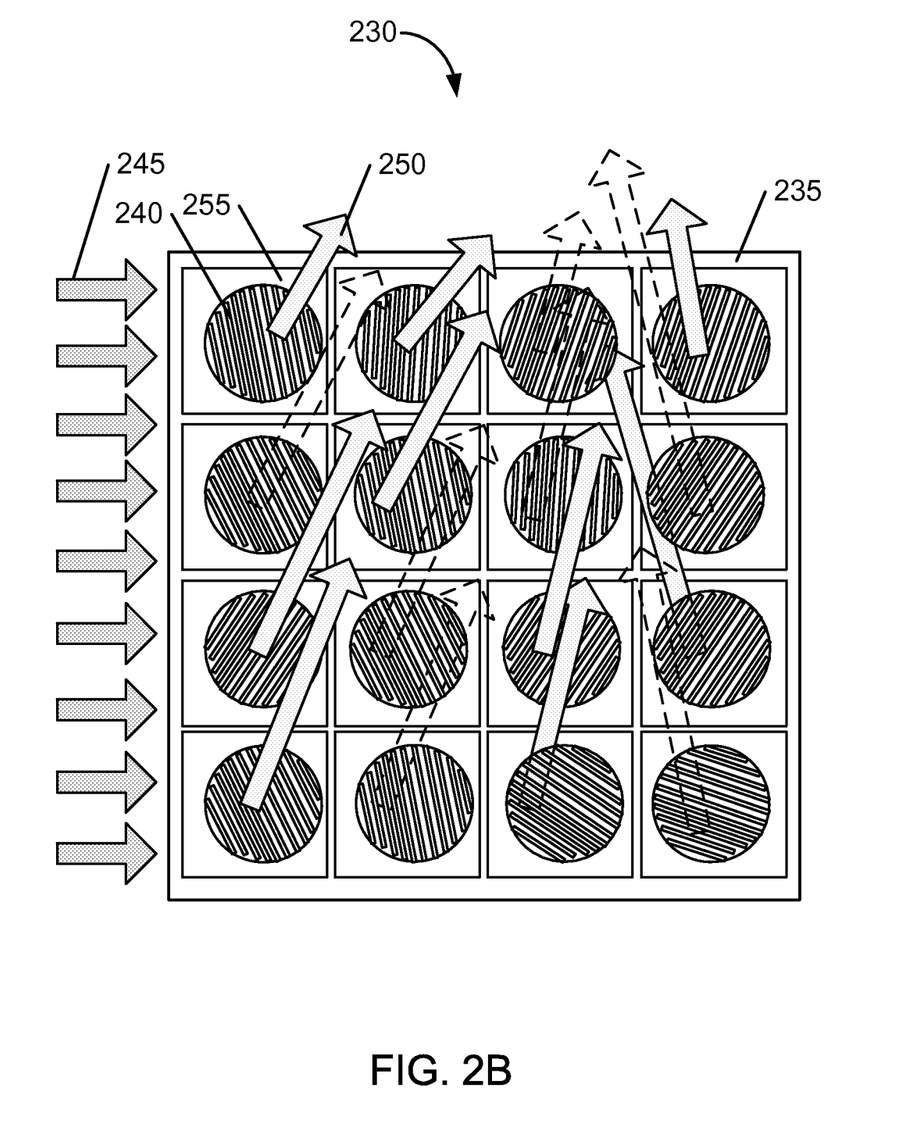

Similarly, in FIG. 2B, directional backlight 230 is show with a directional backplane 235 consisting of a plurality of circular directional pixels (e.g., directional pixel 240) arranged in a transparent slab. Each directional pixel is able to scatter a portion of the input planar lightbeams 245 into an output directional lightbeam (e.g., directional lightbeam 250). Each directional lightbeam is modulated by a modulator, e.g., LCD cell 255 for directional lightbeam 250. The directional lightbeams scattered by all the directional pixels in the directional backplane 235 and modulated by the modulators (e.g., LCD cell 255) can represent multiple image views that when combined form a 3D image.

In various examples, a single modulator may be used to modulate a set of directional lightbeams from a set of directional pixels. That is, a given modulator may be placed above a set of directional pixels instead of having a single modulator per directional pixel as shown in FIGS. 2A-B.

Figure 3A:
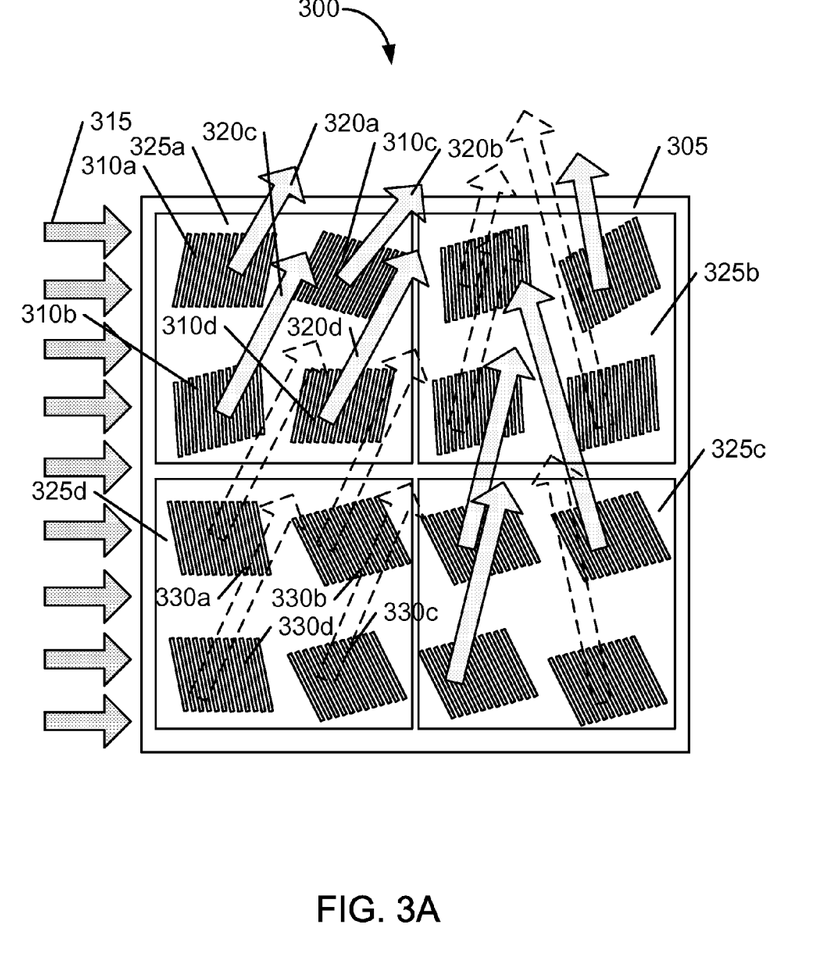
FIGS. 3A-B illustrate further top views of a directional backlight according to FIG. 1.

Referring now to FIGS. 3A-B, top views of a directional backlight according to FIG. 1 are described. In FIG. 3A, directional backlight 300 is show with a directional backplane 305 consisting of a plurality of polygonal directional pixels (e.g., directional pixel 310a) arranged in a transparent slab. Each directional pixel is able to scatter a portion of the input planar lightbeams 315 into an output directional lightbeam (e.g., directional lightbeam 320a). A set of directional lightbeams (e.g., directional lightbeams 320a-d scattered by directional pixels 310a-d) is modulated by a modulator (e.g., LCD cell 325a to modulate directional lightbeams 320a-d). For example, LCD cell 325a is used to turn on directional pixels 310a-d while LCD cell 325d is used to turn off directional pixels 330a-d. The directional lightbeams scattered by all the directional pixels in the directional backplane 305 and modulated by the LCD cells 325a-d can represent multiple image views that when combined form a 3D image.

Figure 3B:
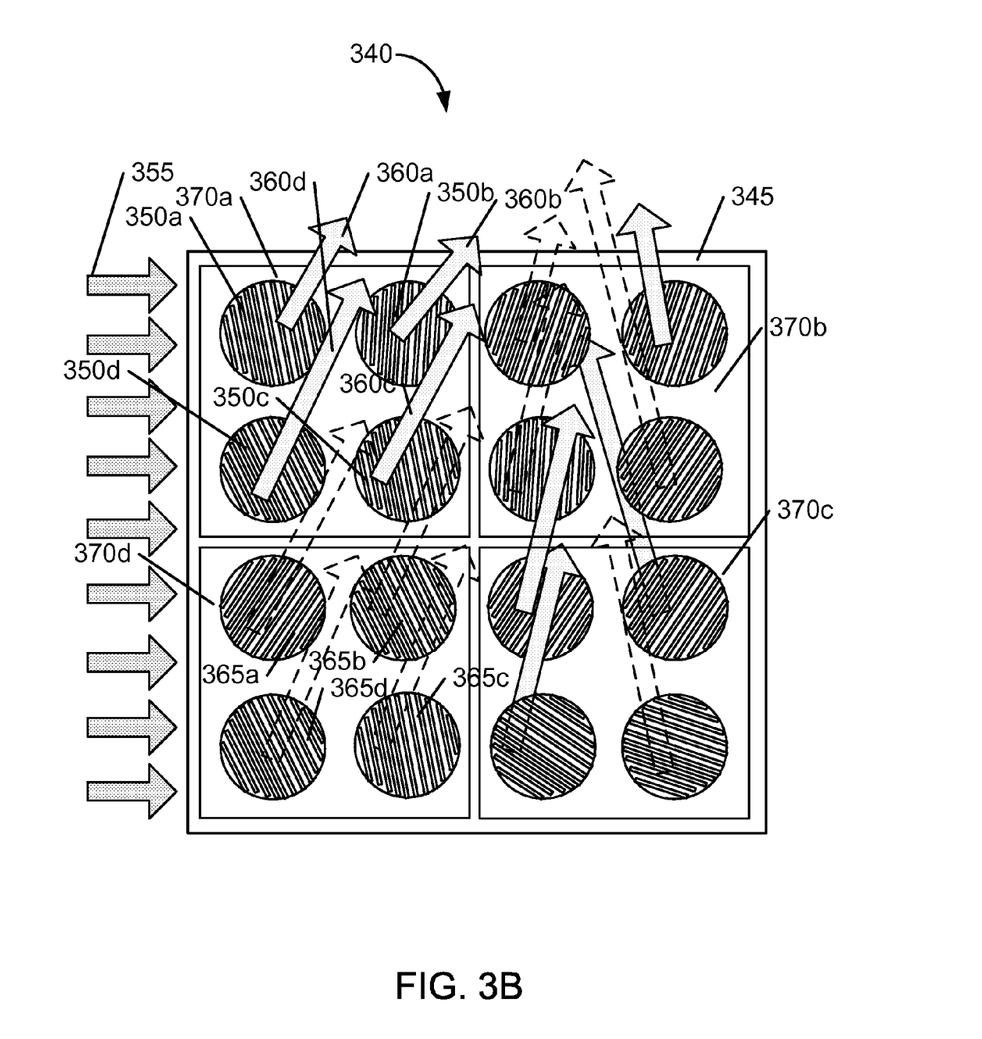

Similarly, in FIG. 3B, directional backlight 340 is show with a directional backplane 345 consisting of a plurality of circular directional pixels (e.g., directional pixel 350a) arranged in a transparent slab. Each directional pixel is able to scatter a portion of the input planar lightbeams 355 into an output directional lightbeam (e.g., directional lightbeam 360a). A set of directional lightbeams (e.g., directional lightbeams 360a-d scattered by directional pixels 350a-d) is modulated by a modulator (e.g., LCD cell 370a to modulate directional lightbeams 360a-d). For example, LCD cell 370a is used to turn on directional pixels 350a-d while LCD cell 370d is used to turn off directional pixels 365a-d. The directional lightbeams scattered by all the directional pixels in the directional backplane 345 and modulated by modulators such as the LCD cells 370a-d can represent multiple image views that when combined form a 3D image.

Figure 4:
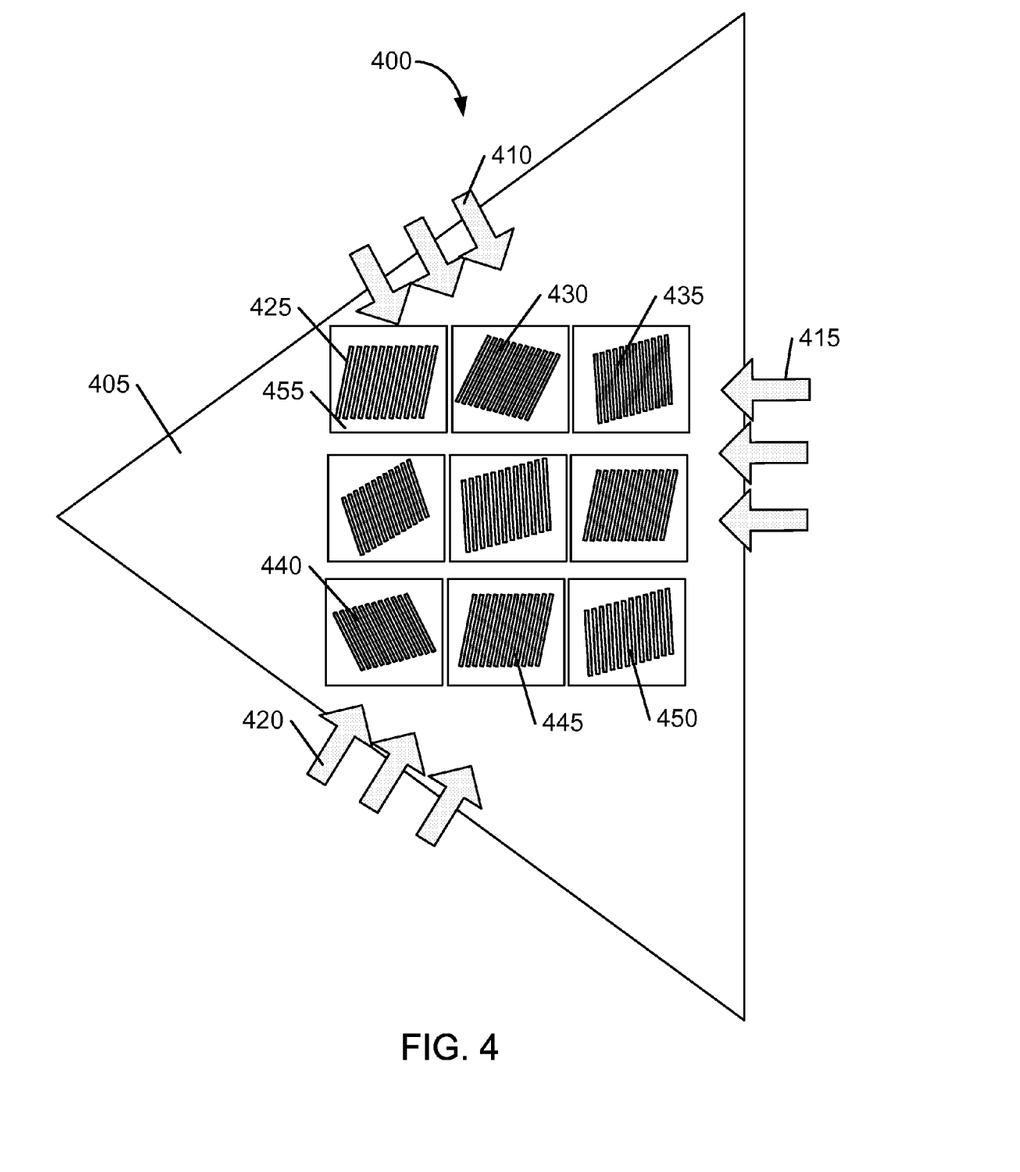
FIG. 4 illustrates a directional backlight having a triangular shape.
Figure 5:
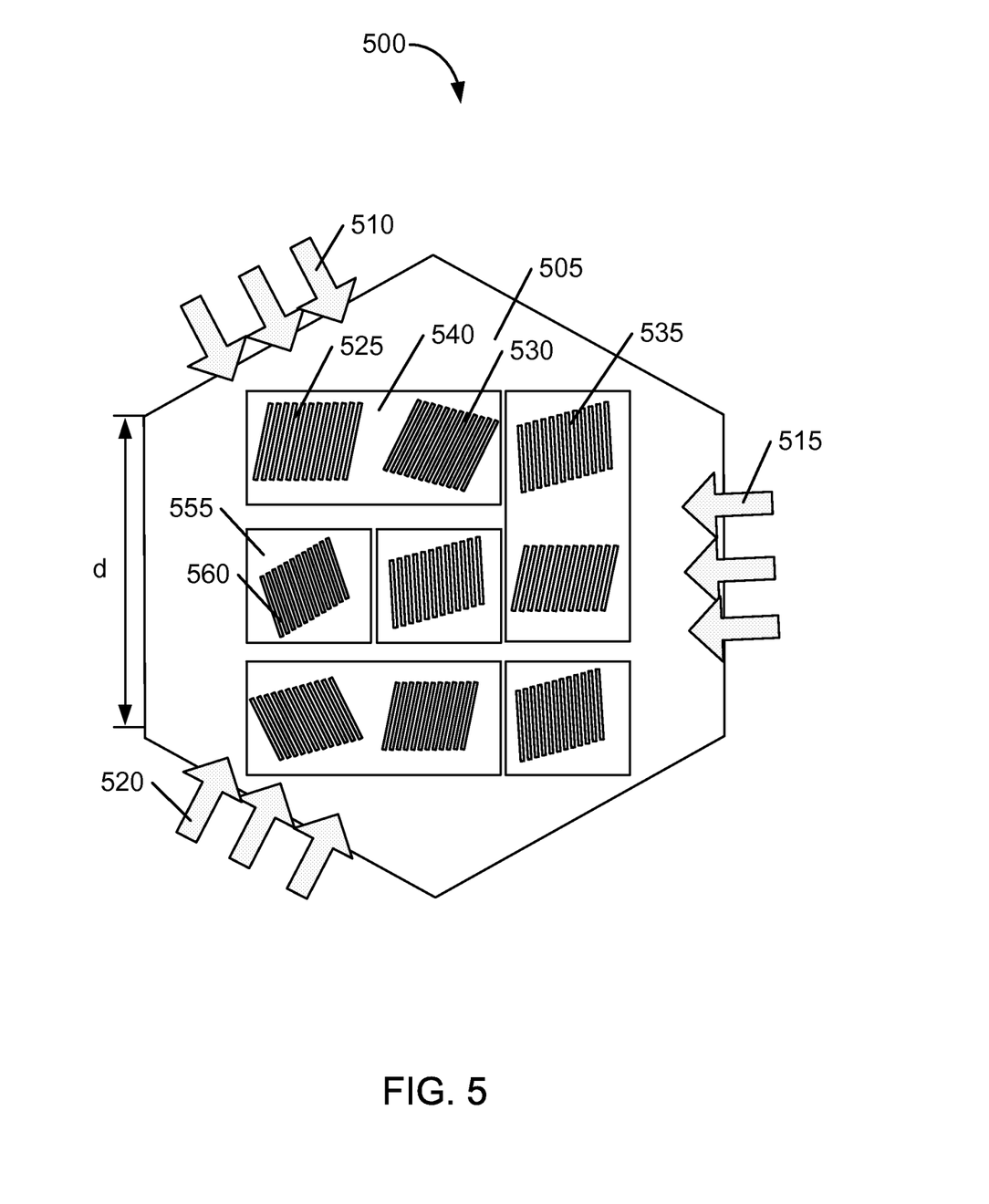
FIG. 5 illustrates a directional backlight having an hexagonal shape.
Figure 6:
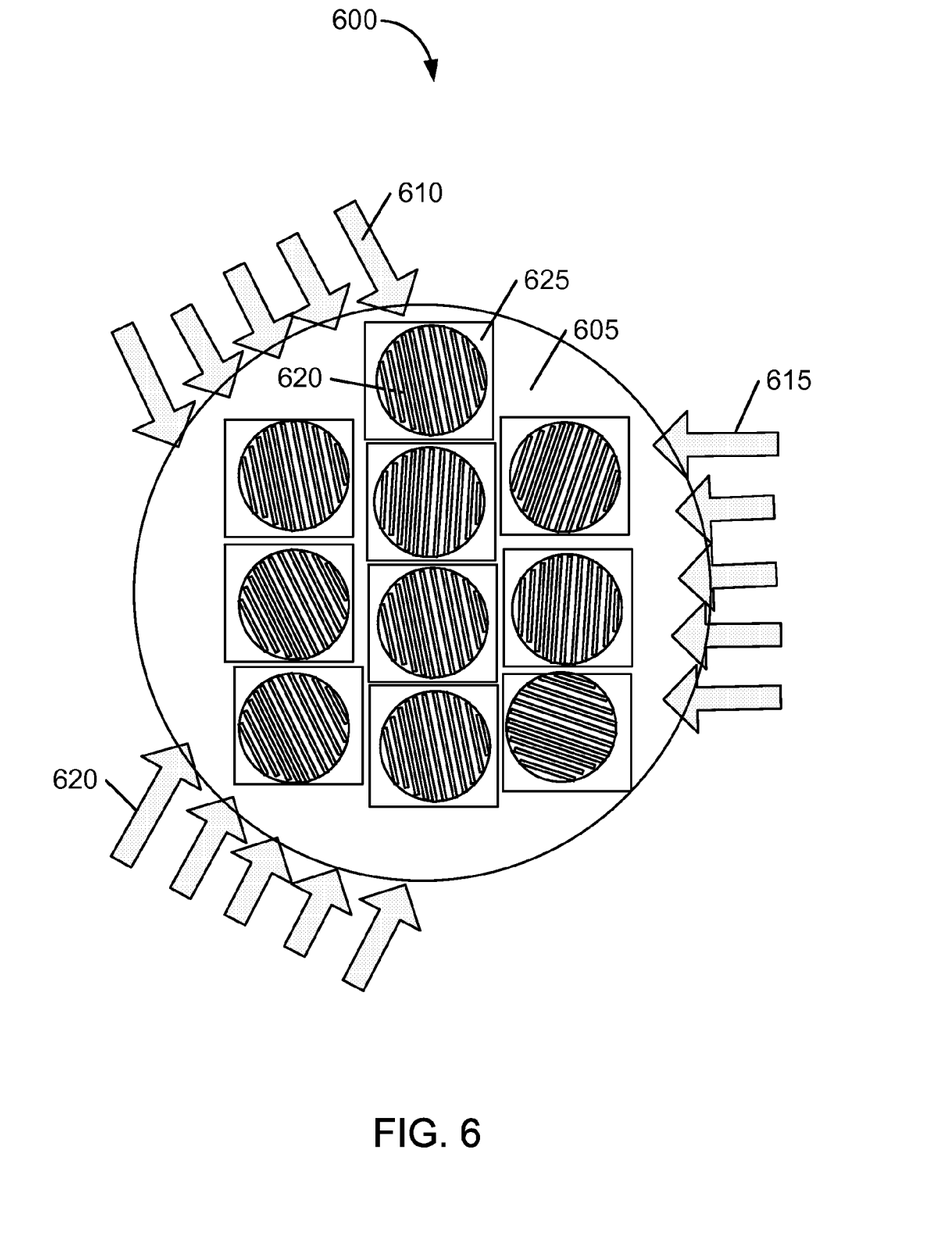
FIG. 6 illustrates a directional backlight having a circular shape.

It is appreciated that a directional backplane may be designed to have different shapes, such as, for example, a triangular shape (as shown in FIG. 4), a hexagonal shape (as shown in FIG. 5), or a circular shape (as shown in FIG. 6). In FIG. 4, the directional backplane 405 receives input planar lightbeams from three different spatial directions, e.g., input planar lightbeams 410-420. This configuration may be used when the input planar lightbeams represent light of different colors, e.g., with input planar lightbeams 410 representing a red color, input planar lightbeams 415 representing a green color, and input planar lightbeams 420 representing a blue color. Each of the input planar lightbeams 410-420 is disposed on a side of the triangular directional backplane 405 to focus their light on a set of directional pixels. For example, the input planar lightbeams 410 is scattered into directional lightbeams by a set of directional pixels 425-435. This subset of directional pixels 425-435 may also receive light from the input planar lightbeams 415-420. However, by design this light is not scattered in the intended view zone of the directional backlight 400.

For example, suppose that input planar lightbeams 410 are scattered by a subset $G_A$ of directional pixels 425-435 into an intended view zone. The intended view zone may be specified by a maximum ray angle $\theta_{max}$ measured from a normal to the directional backlight 400. Input planar lightbeams 410 may also be scattered by a subset of directional pixels $G_B$ 440-450, however those unwanted rays are outside the intended view zone as long as:

$$\sin\theta_{max} \leq \frac{\lambda_A + \lambda_B}{\lambda_A \lambda_B} \sqrt{\left(\frac{n_{eff}^A}{\lambda_A}\right)^2 + \left(\frac{n_{eff}^B}{\lambda_B}\right)^2 - \left(\frac{n_{eff}^A}{\lambda_A}\right)\left(\frac{n_{eff}^B}{\lambda_B}\right)} \quad \text{(Eq. 2)}$$

where $\lambda_A$ is the wavelength of input planar lightbeams 410, $n_{eff}^A$ is the effective index of horizontal propagation of input planar lightbeams 410 in the directional backplane 405, $\lambda_B$ is the wavelength of input planar lightbeams 420 (to be scattered by directional pixels 440-450), and $n_{eff}^B$ is the effective index of horizontal propagation of input planar lightbeams 420 in the directional backplane 405. In case where the effective indices and wavelengths are substantially the same, Equation 2 reduces to:

$$\sin\theta_{max} \leq \frac{n_{eff}}{2} \quad \text{(Eq. 3)}$$

For a directional backplane of refractive index n above 2 with input planar lightbeams propagating near the grazing angle, it is seen that the intended view zone of the display can be extended to the whole space ($n_{eff} \geq 2$ and $\sin\theta_{max} \sim 1$). For a directional backplane of lower index such as glass (e.g., n=1.46), the intended view zone is limited to about $\theta_{max} < \arcsin(n/2)$ (±45° for glass).

It is appreciated that each directional lightbeam may be modulated by a modulator, such as, for example, LCD cell 455. Since precise directional and angular control of directional lightbeams can be achieved with each directional pixel in the directional backplane 405 and the directional lightbeams can be modulated by modulators such as LCD cells, the directional backlight 405 can be designed to generate many different views of 3D images.

It is further appreciated that the directional backplane 405 shown in FIG. 4 may be shaped into a more compact design by realizing that the extremities of the triangular slab can be cut to form a hexagonal shape, as shown in FIG. 5. The directional backplane 505 receives input planar lightbeams from three different spatial directions, e.g., input planar lightbeams 510-520. Each of the input planar lightbeams 510-520 is disposed on alternating sides of the hexagonal directional backplane 505 to focus its light on a subset of directional pixels (e.g., directional pixels 525-535). In various examples, the hexagonal directional backplane 505 has a side length that may range in the order of 10-30 mm, with a directional pixel size in the order of 10-30 μm.

It is appreciated that directional backlight 500 is shown with multiple configurations of modulators. For example, a single modulator may be used to modulate directional lightbeams from a set of directional pixels, e.g., LCD cell 540 for directional pixels 525-535, or a single modulator may be used to modulate a single directional pixel, e.g., LCD cell 555 for directional pixel 560. One skilled in the art appreciates that any configuration of modulators for use with directional pixels may be used to modulate directional lightbeams scattered by the directional pixels.

It is also appreciated that the directional backlight for use with color input planar lightbeams can have any geometrical shape besides a triangular (FIG. 4) or hexagonal shape (FIG. 5) as long as light from three primary colors is brought from three different directions. For example, the directional backlight may be a polygon, a circle, an ellipse, or another shape able to receive light from three different directions. Referring now to FIG. 6, a directional backlight having a circular shape is described. Directional backplane 605 in directional backlight 600 receives input planar lightbeams 610-620 from three different directions. Each directional pixel has a circular shape, e.g., directional pixel 620, and scatters a directional lightbeam that is modulated by a modulator, e.g., LCD cell 625. Each LCD cell has a rectangular shape and the circular directional backplane 605 is designed to accommodate the rectangular LCD cells for the circular directional pixels (or for polygonal directional pixels if desired).

Figure 7:
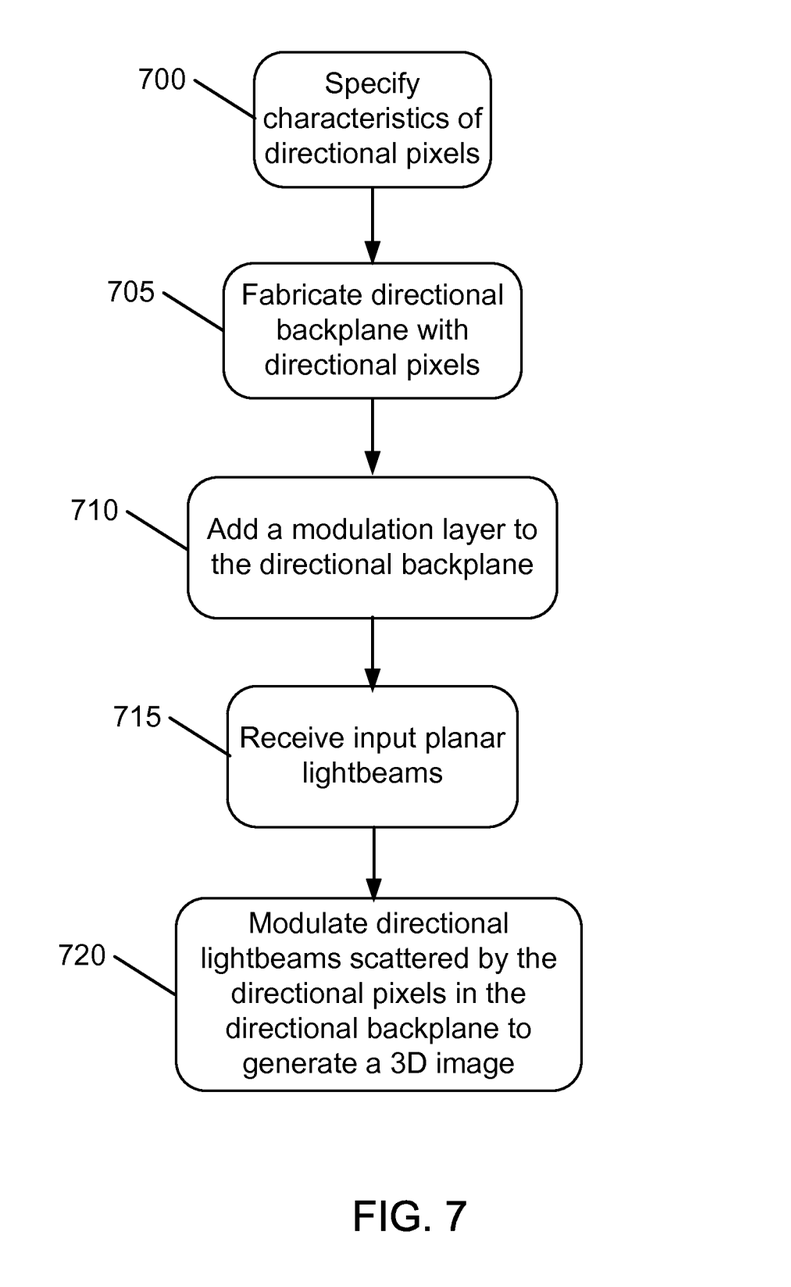
FIG. 7 is a flowchart for generating a 3D image with a directional backlight in accordance with various examples.

A flowchart for generating a 3D image with a directional backlight in accordance with the present application is illustrated in FIG. 7. First, the characteristics of the directional pixels of the directional backlight are specified (700). The characteristics may include characteristics of the patterned gratings in the directional pixels, such as, for example, a grating length, a grating width, an orientation, a pitch, and a duty cycle. As described above, each directional pixel in the directional backlight can be specified with a given set of characteristics to generate a directional lightbeam having a direction and an angular spread that is precisely controlled according to the characteristics.

Next, a directional backplane with directional pixels is fabricated (705). The directional backplane is made of a transparent material and may be fabricated with any suitable fabrication technique, such as, for example, optical lithography, nano-imprint lithography, roll-to-roll imprint lithography, direct embossing with an imprint mold, among others. The directional pixels may be etched in the directional backplane or be made of patterned gratings with material deposited on top of the directional backplane (e.g., any material that can be deposited and etched or lift-off, including any dielectrics or metal).

A modulation layer (e.g., an LCD-based modulation layer) is then added to the directional backplane (710). The modulation layer includes a plurality of modulators (e.g., LCD cells) that are placed on top of a spacer layer (as shown in FIG. 1) above the directional backplane. As described above, the modulation layer may be designed to have a single modulator for a single directional pixel or a single modulator for a set of directional pixels. As further described above, the directional backplane (and the directional pixels) may have different shapes (e.g., polygon, triangular, hexagonal, circular, etc.) to accommodate the modulation layer made of rectangular shaped modulators.

Light from a plurality of narrow-bandwidth light sources is input into the directional backplane in the form of input planar lightbeams (715). Lastly, a 3D image is generated from the modulated directional lightbeams that are scattered by the directional pixels in the directional backplane (720).

Advantageously, the precise control that is achieved with the directional pixels and modulation in the directional backlight enables a 3D image to be generated with an easy to fabricate substantially planar structure. Different configurations of directional pixels generate different 3D images. In addition, the directional lightbeams generated by the directional pixels can be modulated to produce any desired effect in the generated images. The directional backlights described herein can be used to provide 3D images in display screens (e.g., in TVs, mobile devices, tablets, video game devices, and so on) as well as in other applications, such as, for example, 3D watches, 3D art devices, 3D medical devices, among others.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A directional backlight, comprising:
a directional backplane comprising a slab of transparent material configured to guide a plurality of input planar lightbeams, the directional backplane having a plurality of directional pixels configured to scatter a portion of the guided input planar lightbeams out of a surface of the transparent material slab into a plurality of directional lightbeams corresponding to directions of different views of a three-dimensional (3D) image, each directional lightbeam having a direction and angular spread controlled by characteristics of a directional pixel in the plurality of directional pixels; and
a modulation layer having a plurality of modulators configured to modulate the plurality of directional lightbeams,
wherein a directional pixel of the plurality of directional pixels comprises a patterned grating one or both of in and on the surface of the transparent material slab.

2. The directional backlight of claim 1, further comprising a spacer layer positioned above the directional backplane.

3. The directional backlight of claim 2, wherein the modulation layer is positioned above the spacer layer.

4. The directional backlight of claim 1, wherein the transparent material slab of the directional backplane is substantially planar, the plurality of input planar lightbeams being configured to propagate within a plane of the substantially planar transparent material slab.

5. The directional backlight of claim 1, wherein the patterned grating comprises a plurality of substantially parallel grooves.

6. The directional backlight of claim 1, wherein the characteristics of a directional pixel comprise a grating length, a grating width, a grating orientation, a grating pitch, and a grating duty cycle of the patterned grating.

7. The directional backlight of claim 6, wherein the grating pitch and the grating orientation of the patterned grating control the direction of a directional lightbeam scattered by the directional pixel.

8. The directional backlight of claim 6, wherein the grating length and the grating width of the patterned grating control the angular spread of a directional lightbeam scattered by a directional pixel.

9. The directional backlight of claim 1, wherein a single modulator from the plurality of modulators modulates a directional lightbeam from a single directional pixel.

10. The directional backlight of claim 1, wherein a single modulator from the plurality of modulators modulates directional lightbeams from a set of directional pixels.

11. The directional backlight of claim 1, wherein the directional backplane comprises a polygonal slab of transparent material.

12. The directional backlight of claim 1, wherein the directional backplane comprises a circular slab of transparent material.

13. The directional backlight of claim 1, wherein the plurality of directional pixels comprises a plurality of polygonal directional pixels.

14. The directional backlight of claim 1, wherein the plurality of directional pixels comprises a plurality of circular directional pixels.

15. The directional backlight of claim 1, wherein the modulation layer comprises an LCD-based modulation layer and the plurality of modulators comprises a plurality of LCD cells.

16. A method for generating a 3D image with a directional backlight having a modulation layer, comprising:
- specifying a plurality of characteristics for a plurality of directional pixels, each directional pixel comprising a patterned grating;
- fabricating a directional backplane comprising a slab of transparent material with the plurality of directional pixels arranged thereon, the transparent material slab being configured to guide a lightbeam;
- adding a modulation layer having a plurality of modulators above the directional backplane;
- illuminating the directional backplane with a plurality of input planar lightbeams, the input planar lightbeams being guided within the transparent material slab and being scattered out of the transparent material slab by the plurality of directional pixels into a plurality of directional lightbeams; and
- modulating the plurality of directional lightbeams with the plurality of modulators to generate multiple views of a 3D image.

17. The method of claim 16, wherein each directional lightbeam is controlled by the characteristics of a directional pixel.

18. The method of claim 16, wherein the characteristics of a directional pixel comprise a grating length, a grating width, a grating orientation, a grating pitch, and a grating duty cycle of the patterned grating.

19. The method of claim 16, wherein a single modulator from the plurality of modulators modulates a directional lightbeam from a single directional pixel.

20. The method of claim 16, wherein a single modulator from the plurality of modulators modulates directional lightbeams from a set of directional pixels.

21. The method of claim 16, wherein the modulation layer comprises an LCD-based modulation layer and the plurality of modulators comprises a plurality of LCD cells.

22. A three-dimensional (3D) image-forming directional backlight, comprising:
- a directional backplane comprising a material layer configured to guide light as a planar lightbeam within the material layer, the directional backplane having a plurality of directional pixels configured to scatter out a portion of a plurality of input planar lightbeams guided within the material layer into a plurality of directional lightbeams directed away from a surface of the directional backplane as a light field, each directional pixel comprising a patterned grating, each directional lightbeam having a direction and an angular spread controlled by characteristics of a directional pixel in the plurality of directional pixels; and
- a modulation layer having a plurality of modulators configured to modulate the plurality of directional lightbeams, the modulation layer being adjacent to the surface of the directional backplane,
- wherein a set of modulated directional lightbeams from a corresponding set of the directional pixels represents a view of a plurality of different views that form a 3D image.

23. The 3D image-forming directional backlight of claim 22, wherein each modulator of the modulation layer is configured to modulate a single lightbeam from a single directional pixel.

24. The 3D image-forming directional backlight of claim 22, wherein a grating pitch and a grating orientation of the patterned grating of a directional pixel control a direction of a directional lightbeam scattered by the directional pixel.

* * * * *